United States Patent
Salmon et al.

(10) Patent No.: US 11,436,194 B1
(45) Date of Patent: Sep. 6, 2022

(54) STORAGE SYSTEM FOR FILE SYSTEM OBJECTS

(71) Applicant: Tintri by DDN, Inc., Santa Clara, CA (US)

(72) Inventors: Brandon W. Salmon, Menlo Park, CA (US); Khian Thong Lim, Fremont, CA (US); David Brian Milani, Sunnyvale, CA (US)

(73) Assignee: Tintri by DDN, Inc., Santa Clara, CA (US)

( * ) Notice: Subject to any disclaimer, the term of this patent is extended or adjusted under 35 U.S.C. 154(b) by 22 days.

(21) Appl. No.: 16/725,135

(22) Filed: Dec. 23, 2019

(51) Int. Cl.
*G06F 16/16* (2019.01)

(52) U.S. Cl.
CPC .................. *G06F 16/164* (2019.01)

(58) Field of Classification Search
CPC .................................................. G06F 16/164
USPC ........................................................ 707/703
See application file for complete search history.

(56) References Cited

U.S. PATENT DOCUMENTS

| | | | |
|---|---|---|---|
| 2011/0010496 A1* | 1/2011 | Kirstenpfad | G06F 16/10 711/E12.001 |
| 2017/0039218 A1* | 2/2017 | Prahlad | G06F 16/1827 |
| 2017/0235507 A1* | 8/2017 | Sinha | G06F 11/2069 711/114 |
| 2017/0249333 A1* | 8/2017 | Krishnan | G06F 16/185 |
| 2020/0364190 A1* | 11/2020 | Das | G06F 16/13 |

OTHER PUBLICATIONS

Van Moolenbroek, David C., et al., "Transaction-based Process Crash Recovery of File System Namespace Modules", PRDC 2013, Vancouver, BC, Canada, Dec. 2-4, 2013, pp. 338-347.*
"Namespace", Wikipedia, downloaded from: https://en.wikipedia.org/wiki/Namespace on Nov. 8, 2021, pp. 1-9.*
Kleiman, S. R., "Vnodes: An architecture for Multiple File Systems Types in Sun UNIX", Usenix, vol. 86, Summer 1986, pp. 1-10.*
Microsoft Computer Dictionary, 5th Edition, Microsoft Press, Redmond, WA, © 2002, pp. 102, 356, 424 and 474.*
Holos, Haris, et al., "Aerie: Flexible File-System Interfaces to Storage-Class Memory", Eurosys 2014, Amsterdam, Netherlands, Apr. 13-16, 2014, 14 pages.*

* cited by examiner

*Primary Examiner* — Robert Stevens
(74) *Attorney, Agent, or Firm* — Van Pelt, Yi & James LLP

(57) ABSTRACT

File system object storage is disclosed, including: receiving, via a communication interface, a request to perform a file system operation; determining a file system object associated with the request, wherein the file system object comprises two or more files; and performing the file system operation in a manner determined at least in part by data associated with the file system object.

21 Claims, 12 Drawing Sheets

STORAGE SYSTEM FOR FILE SYSTEM OBJECTS

BACKGROUND OF THE INVENTION

Data belonging to application-level objects, which are application-level logical constructs, are stored on storage systems. Typical storage systems store data as granularities such as files, file systems, LUNs, and volumes, for example. However, it is difficult to keep track of data of application-level objects and the typical storage system granularities (e.g., files, file systems, LUNs, and volumes) at a storage system to which they map. The difficulty in mapping application-level objects to typical storage abstractions also makes imposing storage management policies at a desired granularity with respect to an application-level object, inconvenient. Furthermore, typical storage systems also make viewing statistics at a desired granularity with respect to an application-level object inconvenient.

BRIEF DESCRIPTION OF THE DRAWINGS

Various embodiments of the invention are disclosed in the following detailed description and the accompanying drawings.

DETAILED DESCRIPTION

Figure 1:
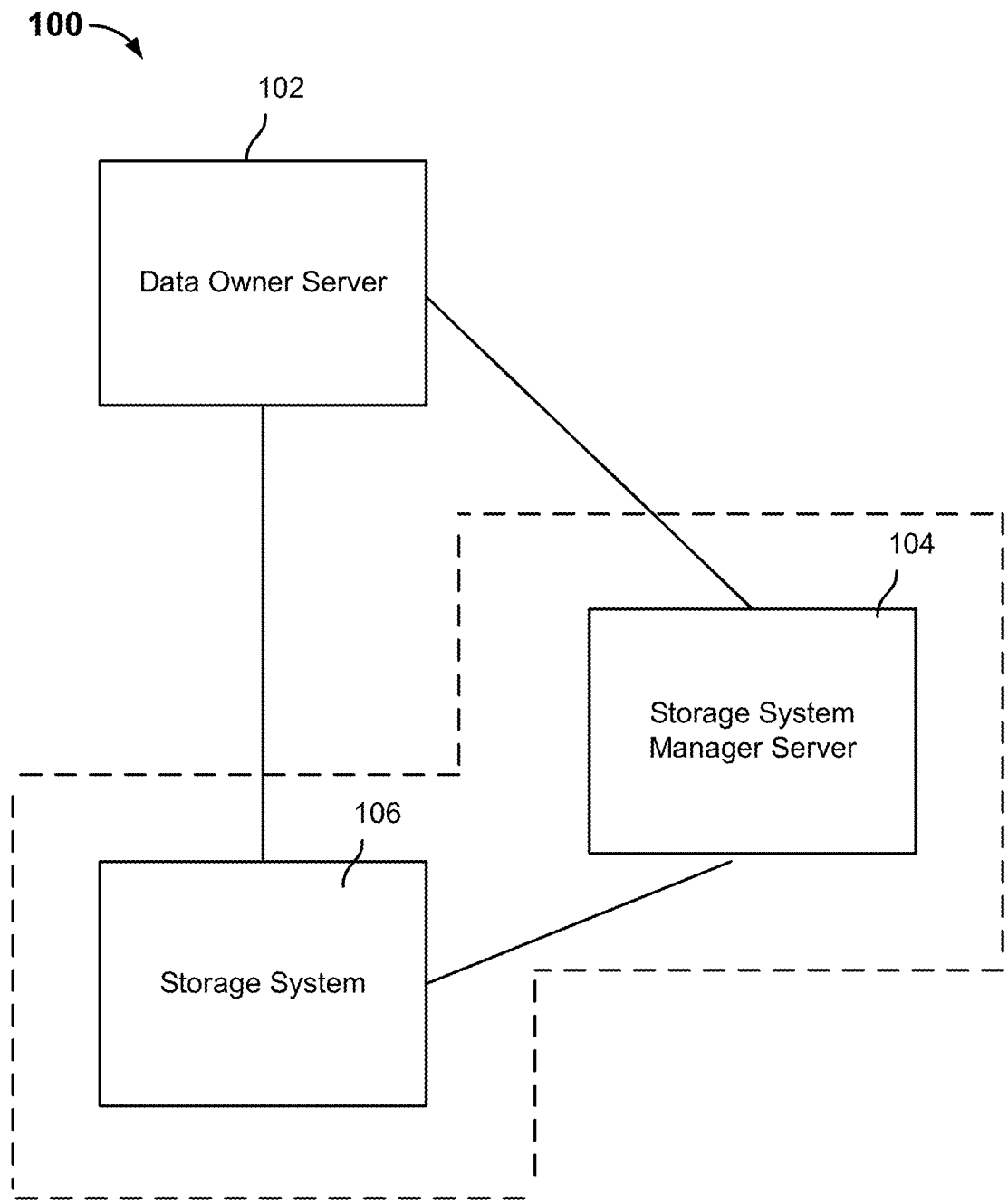
FIG. 1 is a diagram showing an embodiment of a system for storing file system objects.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Operations performed on and by storage systems are ultimately to meet objective requirements of an application and its value to an enterprise. For example, providing certain guarantees of resiliency, availability and access performance for an application's data are management operations typically performed on storage system objects but with the goal of meeting service level objectives of the application. Because these operations are performed on storage system objects and because an application's set of storage objects may change dynamically, such operations were traditionally conducted on conventional storage constructs such as LUNs or volumes, for example, and with only an obscure relationship to the application. These conventional storage constructs typically may contain multiple applications and require storage managers to work at properly balancing workloads and provisioning to accommodate groups of applications. This is both inefficient for the storage managers but also reduces the efficiency of the storage resources. Further, it decreases the agility of bringing new applications and services online. As will be described below, various embodiments described herein bridges the gap between application level constructs and storage constructs (which are sometimes referred to "file system objects"). Various embodiments described herein not only allow storage managers to deliver objectives at the granularity of the application, but it also brings many of these management operations into the hands of application owners without their need to understand the idiosyncrasies of storage constructs. Various embodiments described herein define and maintain an application's set of storage constructs allowing for better end-to-end performance visibility, automation of work to maintain service objectives through policies, improved operational and capital resource efficiency and more end-user control.

Embodiments of storage of file system objects are described herein. A request to perform a file system operation is received at a storage system. A file system object, comprising two or more files, that is associated with the request is determined. As will be described in further detail below, a "file system object" comprises a dynamically definable set of two or more files, for which underlying data is stored at a storage system. Put another way, the composition/membership of files that define a "file system object"

may change over time, as files are added to or removed from the file system object. In some embodiments, the two or more files belonging to a file system object may belong to one or more application-level objects. The file system operation is performed in a manner that is determined at least in part by data associated with the file system object. For example, the file system operation may be performed on the granularity of all or only a subset of files at the storage system that are associated with the file system object. In some embodiments, policies can be enacted at a file-level or at the file system object-level. In some embodiments, statistics can be collected at a file-level or at the file system object-level.

As will be described in further detail below, the files that belong to a file system object can be grouped (e.g., via a user input) to be associated with the file system object irrespective of the files' application-level associations. One benefit of grouping files to belong to a single dynamically definable file system object is that such files can be easily be treated similarly, such as, for example, by applying a single file system operation to the file system object rather than individually to each of its membership file.

FIG. 1 is a diagram showing an embodiment of a system for storing file system objects. In the example, system 100 includes data owner server 102, storage system manager server 104, and storage system 106. Each of data owner server 102, storage system manager server 104, and storage system 106 communicates to each other over a network (not shown). For example, the network (not shown) may be implemented using one or more of high-speed and/or data networks.

Data owner server 102 is configured to execute one or more applications. In various embodiments, each application that is executed by data owner server 102 is configured to generate application-level constructs (which are sometimes referred to as "application-level objects") associated with a corresponding application type for which data is to be stored at storage system 106. In a first example, data owner server 102 may be a hypervisor type of application that generates virtual machines (application-level objects) and stores virtual machine (VM), virtual disk (vdisk), or VM-related file data at storage system 106. In a second example, data owner server 102 may be a database server type of application (e.g., a server that executes a database management system) that generates databases (application-level objects) and stores database-related data at storage system 106. In a third example, data owner server 102 may be a Microsoft Sharepoint™ server type of application (e.g., a server that executes a Sharepoint application) that generates Sharepoint Pages (application-level objects) and stores Page-related data at storage system 106. In some embodiments, data owner server 102 may be a physical server or a virtualized server. In some embodiments, a software program (e.g., plugin) may be executing at data owner server 102 to facilitate communication between data owner server 102 and storage system manager server 104. In some embodiments, such a software program (e.g., plugin) may be not needed at data owner server 102 to facilitate communication between data owner server 102 and storage system manager server 104 because storage system manager server 104 is configured to use whichever application programming interface (API) that is normally used by data owner server 102 to communicate with data owner server 102.

In various embodiments, data owner server 102 is configured to communicate with storage system 106 to perform read and write operations on data stored at storage system 106. In some embodiments, data owner server 102 can used any network communication protocol (e.g., SMB, NSF) to send a read operation or a write operation to storage system 106. In various embodiments, the read or write operation sent from data owner server 102 includes a file identifier (ID) of the file that is related to the operation. In some embodiments, data owner server 102 does not transmit application-level object IDs that correspond, if any, to the read or write operations to storage system 106 because storage system 106 does not maintain awareness of application-level object to file system object correspondence. Instead, in some embodiments, storage system manager server 104 receives from data owner server 102 information that describes mappings between file IDs and application-level object IDs. As will be described below, in some embodiments, storage system manager server 104 receives from storage system 106 file system object IDs in response to file system object definitions that storage system manager server 104 sends to storage system 106 and can therefore, translate management operations from data owner server 102 that identify application-level object IDs to operations that identify file system object IDs. The translated operations are then sent by storage system manager server 104 to storage system 106 so that storage system 106 can perform the operation on the appropriate files of the identified file system object ID(s).

In various embodiments, data owner server 102 is configured to communicate with storage system manager server 104 to perform management operations with respect to application-level objects for which data is stored at storage system 106. In some embodiments, unlike read or write operations that operate on the logical content of a file, a "management operation" relates to the definition and lifecycle of file system objects and generally operates on the metadata of files, portions of files, the set of files, and/or storage system objects as a whole. In some embodiments, data owner server 102 is configured to communicate with storage system manager server 104 using whichever application programming interface (API) it is normally configured to use (e.g., so that storage system manager server 104 can leverage the existing API that is used by data owner server 102 to communicate with it). Storage system manager server 104 is then configured to translate the management operation that identifies one or more application-level objects that it received from data owner server 102 into an operation that identifies one or more file system objects and/or specific files that pertain to one or more file system objects. Storage system manager server 104 is configured to send the translated operation to storage system 106. In various embodiments, a management operation may pertain to a specified granularity of a file system object. For example, the specified granularity is all the files of a file system object or only a subset of files of a file system object. Examples of management operations include, but are not limited to, the following: defining a new file system object, taking a snapshot, cloning, reverting to a snapshot, quiescing at least a portion of a file system object, replication, migration, importing a file system object, adding a file to a specified file system object, removing a file from a specified file system object, monitoring, setting a policy for a specified file system object, and changing the ID of a specified file system object. For example, both adding a file to a specified file system object and removing a file from a specified file system object change the file system object definition of the file system object.

Storage system manager server 104 is configured to communicate with one or more data owner servers (while system 100 only shows data owner server 102, storage system manager server 104 may communicate with multiple data owner servers) that execute one or more different types of applications. In some embodiments, storage system manager server 104 is configured to use an API (e.g., SOAP, REST, GRPC) that is used by a data owner server to (e.g., periodically) query data owner server 102 for management operations with respect to application-level objects and for information related to read or write operations that data owner server 102 had directly sent to storage system 106. Storage system manager server 104 is configured to communicate with one or more storage systems (while system 100 only shows one storage system, storage system 106, storage system manager server 104 may communicate with multiple storage systems) that store file system objects. In some embodiments, storage system management server 104 stores logic that is usable to translate management operations that it receives from a data owner server via a first API into a second API that it uses to communicate with any storage system. For example, storage system management server 104 executes various connectors (e.g., software programs), where each connector is configured to translate an application-level management operation that is received from a data owner server associated with a particular application type into a standard file system object operation that is to be sent to a storage system.

In some embodiments, storage system manager server 104 is configured to provide a user interface. In some embodiments, the user interface is configured to receive user input that defines which files belong to a file system object that is stored at storage system 106. In some embodiments, the user interface is configured to receive user input that defines policies associated with a file system object that is stored at storage system 106. In some embodiments, the user interface is configured to present a list of file system objects that are stored at storage system 106 (and/or at other storage systems) and their corresponding information (e.g., names, statistics, application types). Storage system manager server 104 may query storage system 106 for information that is to be presented at the user interface.

Storage system 106 is configured to store and manage files that are associated with file system objects. As mentioned above, a "file system object" comprises a dynamically definable set of one or more files for which underlying data is stored at storage system 106. In some embodiments, a user or application input can specify (e.g., via a user interface that is provided by storage system 106 or by storage system manager server 104) any set of arbitrary file(s), for which data is stored at storage system 106, to be associated with the same file system object at storage system 106. In some embodiments, storage system 106 is configured to receive, from storage system manager server 104, a file system object definition that defines which one or more files to associate with the same file system object. In some embodiments, storage system manager server 104 is configured to use an API to send file system object definitions and/or other instructions (e.g., file system operations) to storage system 106. The files that are associated with a file system object can be dynamically defined (e.g., by a user). Put another way, files for which data have been stored to storage system 106 can be dynamically added to and removed from a file system object. Given that files belonging to the same file system object can easily be treated similarly by storage system 106 (e.g., based on operations that pertain to the entire file system object or policies that are configured specifically for the file system object), the dynamic file composition of can enable great flexibility on how storage system 106 can be used to manage files. In some embodiments, a file system object definition that is sent from storage system manager server 104 to storage system 106 does not include an existing file system object ID to indicate that a new file system object is being defined. And, in some embodiments, a file system object definition that is sent from storage system manager server 104 to storage system 106 includes an existing file system object ID to indicate that the definition of the corresponding file system object is being updated (e.g., with the addition or removal of or more files that are stored at storage system 106).

In various embodiments, storage system 106 is configured to generate a file system object by associating together a set of files based on a file system object definition that it receives from storage system manager server 104. In various embodiments, storage system 106 is configured to assign a unique file system object identifier (ID) to each file system object. In some embodiments, storage system 106 is configured to send the unique file system object ID of each newly created file system object to storage system manager server 104. In some embodiments, storage system manager server 106 is configured to store mappings between application-level object identifiers (IDs) and file system object IDs and/or mappings between application-level object IDs and file IDs. In some embodiments, an application-level object ID may also include the type of application to which the object belongs. In some embodiments, files that are defined to belong to a file system object at storage system 106 may correspond to a single application-level object. In some embodiments, files that are defined to belong to a file system object at storage system 106 may correspond to a multiple application-level objects. In some embodiments, files that are defined to belong to a file system object at storage system 106 may correspond to one or more application-level objects of one or more application types. Because storage system 106 is capable of storing file system objects corresponding to files belonging to one or more different application objects of one or more application types, storage system 106 is agnostic with respect to application types and can flexibly store data pertaining to any number of different applications and application types. Furthermore, any arbitrary set of files can be defined to belong to the same file system object.

In various embodiments, storage system 106 maintains a set of file system object metadata to keep track of one or more of, but not limited to, the following: the file system object ID, the file ID of each file that belongs to the file system object, where on the storage media the underlying data associated with the file(s) of the file system object is stored (e.g., using indices that store mappings between logical offsets of a file and physical offsets on storage media), and snapshot(s) that have been generated for the file system object. One benefit to storing a set of metadata that maps to a file system object and its associated files is that storage management may be performed at one or more granularities of file system objects, files or sets of files, which are denoted by the stored metadata. In various embodiments, storage system 106 is configured to further store policies that have been set (e.g., by a user) for the file system object and statistics that have been captured for the file(s) of the file system object.

The following is an example that describes interactions among data owner server 102, storage system manager server 104, and storage system 106 in relation to updating the definition of a file system object: Data owner server 102 communicates with storage system 106 to perform write operations to store new files, File A and File B, to storage system 106. Storage system 106 deduplicates the data of File A and File B and stores the two files to the storage media. Storage system manager server 104 can obtain updates pertaining to application-level objects from data owner server 102 to determine that File A and File B pertain to application-level object VM_123. Then, based on the mappings between application-level object IDs and file system object IDs that are stored by storage system manager server 104, storage system manager server 104 determines that file system object ID FS_Foo corresponds to application-level object VM_123. Therefore, storage system manager server 104 then sends an operation to storage system 106 to request storage system 106 to add File A and File B to file system object FS_Foo. Storage system 106 then updates the set of file system object metadata associated with FS_Foo to include at least the file IDs of File A and File B.

In some embodiments, storage system manager server 104 and storage system 106 may be implemented on a single physical entity/server.

In some embodiments, data owner server 102 is configured to directly communicate with storage system 106 to perform both management operations with respect to application-level objects in addition to perform read and write operations on data stored at storage system 106. In such embodiments, data owner server 102 is configured to obtain file system object IDs from storage system 106 and locally store mappings between application-level object IDs and file system object IDs.

Figure 2:
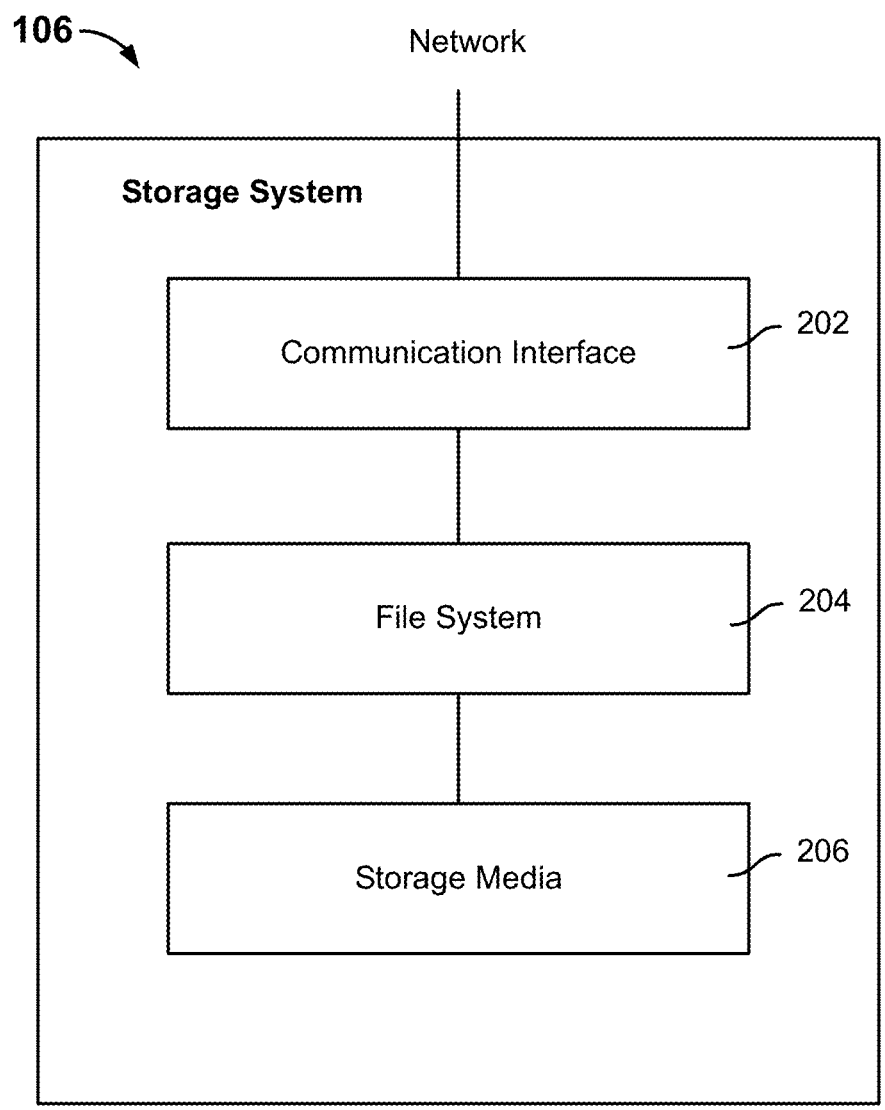
FIG. 2 is a diagram showing an example of a storage system.

FIG. 2 is a diagram showing an example of a storage system. In some embodiments, storage system 106 of system 100 of FIG. 1 may be implemented using the example storage system of FIG. 2. The example storage system of FIG. 2 may be connected to a network (not shown) to communicate with a storage system manager server (e.g., such as storage system manager server 104 of FIG. 1) and one or more data owner servers (e.g., including data owner server 102 of FIG. 1).

In the example storage system of FIG. 2, the storage system includes communication interface 202, file system 204, and storage media 206. In some embodiments, communication interface 202 is configured to receive (e.g., read or write) operations from one or more data owner servers via network communication protocols such as, for example, NFS and SMB. For example, a read operation may request to read at least a portion of at least one file that is stored at storage media 206. For example, a write operation may request to write a new file to storage system 106 or a write operation may request to update a portion of an existing file that is stored at storage media 206. In some embodiments, communication interface 202 is configured to receive management operations from a storage system manager server via an API such as, for example, REST, SOAP, and GRPC. Examples of a management operation include, but are not limited to, the following: defining a new file system object, taking a snapshot of at least a portion of a file system object, cloning a new file system object, reverting at least a portion of a file system object to a snapshot, replication of at least a portion of a file system object, migrating at least a portion of a file system object, importing a file system object, adding a file to the definition of a file system object, removing a file from the definition of a file system object, changing the name of a file system object, monitoring of a least a portion of a file system object, setting a policy for a least a portion of a file system object, and obtaining statistics with respect to at least a portion a file system object.

File system 204 is configured to store file data (e.g., associated with write operations that were received at communication interface 202) to storage media 206. In some embodiments, file system 204 also deduplicates new data to be stored against data that has already been stored to storage media 206 before storing the data at storage media 204. File system 204 is further configured to keep track of which files, for which data has already been stored to storage media 206, have been defined to be part of the same file system object (e.g., based on a management operation to define a file system object that is received at communication interface 202). For example, communication interface 202 is configured to receive, from a data owner server, write operations to update one or more files at storage media 206. Communication interface 202 then passes the write operations to file system 204, which performs the write operations by storing the data pertaining to the files to storage media 206. Communication interface 202 is configured to receive a management operation, from a storage system manager server, that includes a definition of a file system object, which specifies one or more files that have already been written to storage media 206. File system 204 is then configured to generate and/or update a set of metadata that is associated with the defined file system object to indicate that the specified files belong to that file system object. Over time, the file definition/composition of the file system object that is stored at the storage system may change in response to a management operations (that are initially received at communication interface 202 from the storage system manager server) to remove from or add files to a file system object. As the file definition/composition of a file system object changes, file system 204 is configured to update the file system object's corresponding set of metadata to indicate the file ID(s) of the file(s) that are currently part of the file system object. File system 204 is configured to assign a unique file system object ID to each file system object.

In various embodiments, for received file system operations (that originate either from a data owner server or the storage system manager server), file system 204 is further configured to determine one or more file IDs that are relevant to the file system operations and one or more matching file system objects to which the file IDs belong. Operations that are processed by file system 204 may pertain to either a subset of files of a file system object or all the files of a file system object. File system 204 is then configured to obtain sets of metadata that correspond to those matching file system objects and use the sets of metadata to perform the file system operations. In some embodiments, performing a file system operation with respect to at least one file of a file system object includes updating the set of metadata associated with that file system object.

In some embodiments, file system 204 is further configured to store policies with respect to one or more file system objects. In some embodiments, the policies are set by management operations that are received at communication interface 202 from a storage system manager server. Example policies that are set for a file system object may include, but are not limited to, the following: a quality of service, one or more guarantees, one or more resources quotas, a snapshotting schedule, and a retention policy. File system 204 is configured to perform operations pertaining to the files of a file system object in accordance to the policies that have been stored for that file system object.

In some embodiments, file system 204 is configured to collect statistics with respect to each file of each file system object and/or each entire file system object. Examples of statistics include the rate of read and write access to a particular file or file system object, the throughput of a particular file system object, the cache hit ratio achieved by the storage system for a particular file or file system object, and the amount of storage consumed by a file or a file system object. The stored statistical information may be collected, synthesized, and/or presented to a user interface of the storage system (not shown) or sent from the storage system to a storage system manger server and then presented at a user interface of the storage system manger server.

Figure 3:
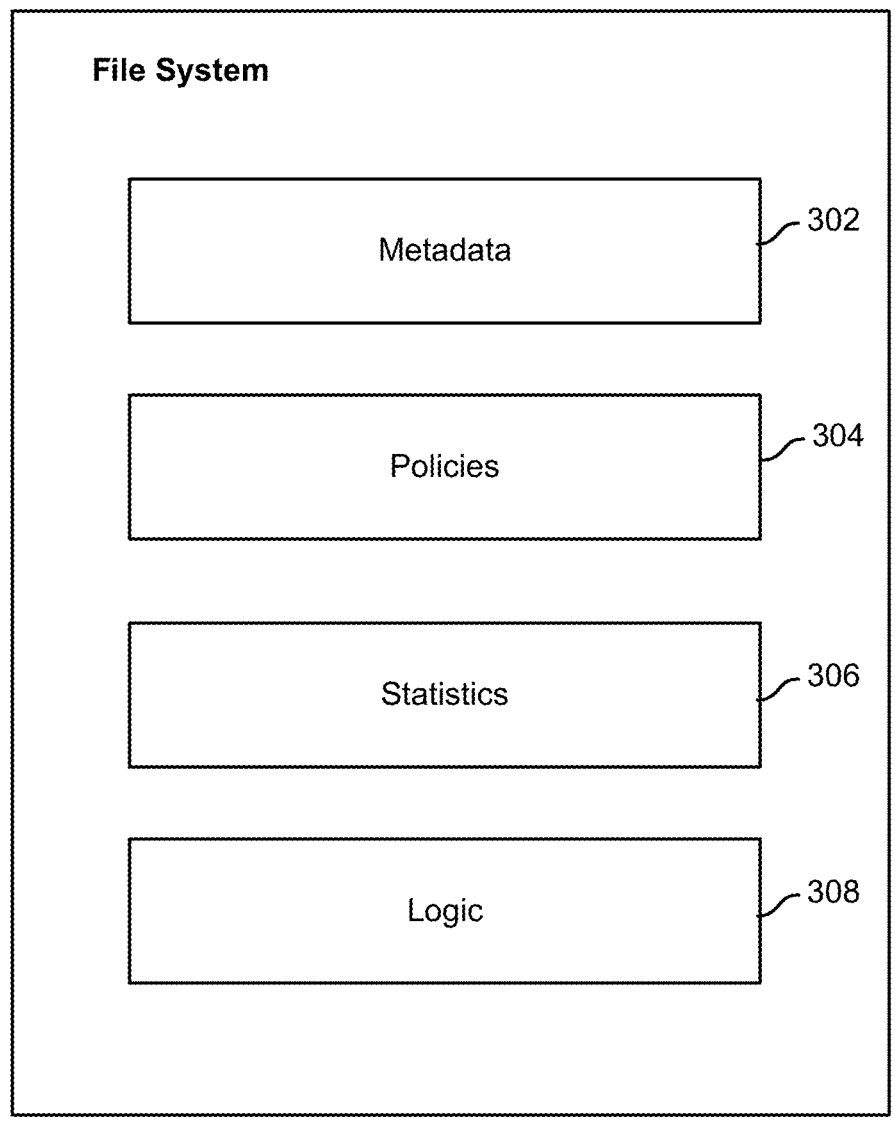
FIG. 3 is a diagram showing an example of a file system.

FIG. 3 is a diagram showing an example of a file system. In some embodiments, file system 204 of FIG. 2 may be implemented using the example file system of FIG. 3. The example file system of FIG. 3 may be connected to a communication interface (not shown) (e.g., such as communication interface 202 of FIG. 2) and also storage media (e.g., such as storage media 206 of FIG. 2). In the example file system of FIG. 3, the file system includes metadata 302, policies 304, statistics 306, and logic 308.

Metadata 302 is a storage that is configured to store sets of metadata corresponding to file system objects. As mentioned above, a corresponding set of metadata is generated for each file system object that has been defined at the storage system. In various embodiments, a set of file system object metadata includes one or more of, but not limited to, the following: the file system object ID, the file ID of each file that belongs to the file system object, where on the storage media the underlying data associated with the file(s) of the file system object is stored (e.g., using indices that store mappings between logical offsets of a file and physical offsets on storage media), and snapshot(s) that have been generated for the file system object. In some embodiments, for each file that belongs to the file system object, the set of metadata that belongs to that file system object stores one or more indices (e.g., B+ trees) that each store mappings between logical offsets of the file and physical offsets at which corresponding data is stored at the storage media. In some embodiments, each snapshot in time that belongs to a file system object is also represented as one or more indices that store mappings between logical offsets of the file and physical offsets at which corresponding data is stored at the storage media, where each index corresponds to a point-in-time at which the snapshot was generated.

Policies 304 are configured to store policies that have been set at a file-level and/or a file system object-level. In some embodiments, the policies stored at policies 304 are obtained from a user interface that is provided by either the storage system or that is provided by a storage system manager server. Example policies that are set for a file system object may include, but are not limited to, the following: a quality of service, one or more guarantees, one or more resources quotas, a snapshotting schedule, and a retention policy.

Statistics 306 are configured to store collected statistics collected at a file-level and/or a file system object-level. In some embodiments, statistics 306 may store a history of statistical information for each file and/or file system object. Examples of statistics include the rate of read and write access to a particular file or file system object, the throughput of a particular file system object, the cache hit ratio achieved by the storage system for a particular file or file system object, and the amount of storage consumed by a file or a file system object.

Logic 308 comprises computer code that, when executed, is configured to use metadata 302, policies 304, and/or statistics 306 to perform operations that pertain to either the file-level or the file system object-level that are received at the storage system. In some embodiments, logic 308 is configured to generate and/update sets of file system object metadata objects in response to read/write operations and/or management operations. In some embodiments, logic 308 is configured to generate and/update the policies stored at policies in response to newly received policies settings. In some embodiments, logic 308 is configured to collect statistics based on performed operations.

Figure 4:
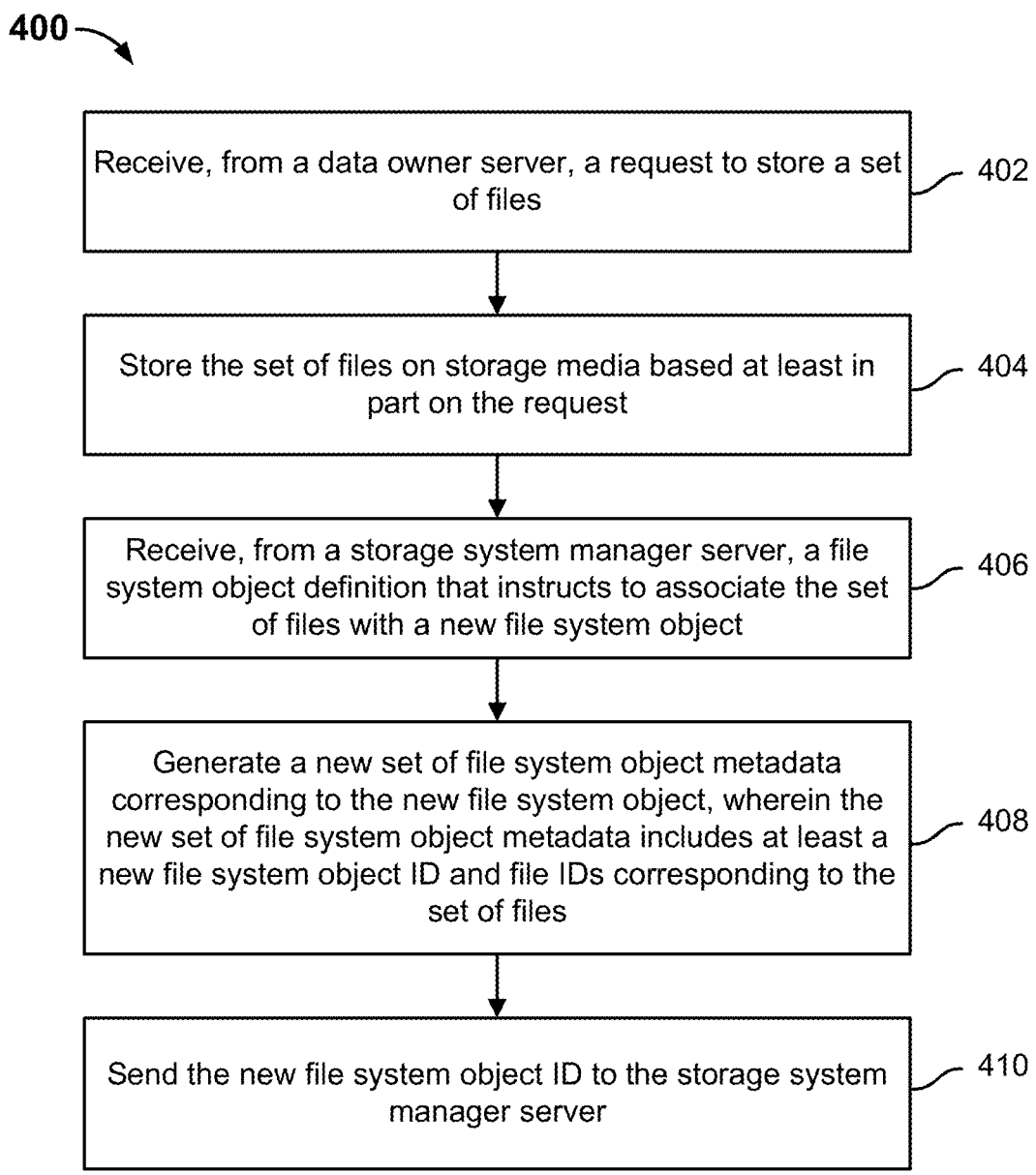
FIG. 4 is a flow diagram showing an example process of generating a new file system object at a storage system.

FIG. 4 is a flow diagram showing an example process of generating a new file system object at a storage system. In some embodiments, process 400 is implemented at a storage system such as storage system 106 of system 100 of FIG. 1.

At 402, a request to store a set of files is received from a data owner server. One or more write operations to write new files to the storage system are sent from a data owner server. For example, a write operation to write a new file includes at least a file ID and the data associated with the file. For example, a file ID is a file path (e.g., an URL) or a file name (e.g., an alphanumeric value). For example, the files may pertain to one or more application-level objects associated with an application that is executed by the data owner server.

At 404, the set of files is stored on storage media based at least in part on the request. The data associated with each new file is written to the storage media (e.g., including hard disk and/or solid state drive). In some embodiments, before data associated with each new file is written to the storage media, it is first divided into data blocks (e.g., each of 8 KB or another configurable size) and then deduplicated against data blocks that have already been stored to the storage media. In some embodiments, a file whose data is stored on the storage media is represented, at least in part, at the storage system is represented as an index (e.g., B+ tree). Only data blocks that have not been previously written to the storage media for existing files are written to the storage media whereas data blocks that have been previously written to the storage media for existing files are not redundantly written to the storage media. For each logical offset of the file to which data has been written, the index stores a mapping to the location (e.g., physical offset) on the physical storage media at which the corresponding data has been stored.

At 406, a file system object definition that instructs to associate the set of files with a new file system object is received from a storage system manager server. The storage system is configured to generate a new file system object based on the received file system object definition. In some embodiments, the file system object definition is user input at the storage system manager server via a user interface that is provided by the storage system manager server. In some embodiments, the file system object definition is sent to the storage system manager server from the data owner server. For example, the set of files that is defined by the file system object definition to belong to the same file system object may map to a single application-level object that is managed by the data owner server. In some embodiments, how files of application-level objects map to files of file system objects is transparent to the storage system.

In some embodiments, the storage system is configured to generate a new file system object in response to a file system object definition that does not include a file system object ID, such as the example of process 300. In some embodiments, the storage system is configured to update the definition of an existing file system object in response to a file system object definition that includes a file system object ID At 408, a new set of file system object metadata corresponding to the new file system object is generated, wherein the new set of file system object metadata includes at least a new file system object ID and file IDs corresponding to the set of files. The storage system generates a new, unique file system object ID corresponding to a new file system object.

The storage system is also configured to generate a set of file system object metadata corresponding to the new file system object. The set of file system object metadata corresponding to the new file system object includes the new file system object ID and the file ID of each file that was indicated by the file system object definition to belong to the new file system object. In some embodiments, the set of file system object metadata corresponding to the new file system object further includes indices, that include mappings between logical to physical offsets, corresponding to the files that belong to the new file system object.

At 410, the new file system object ID is sent to the storage system manager server. As will be described in FIG. 5, below, the storage system manager server stores file system object IDs and their correspondence to one or more application-level objects based on information (e.g., via API) that it has obtained from the data owner server.

Figure 5:
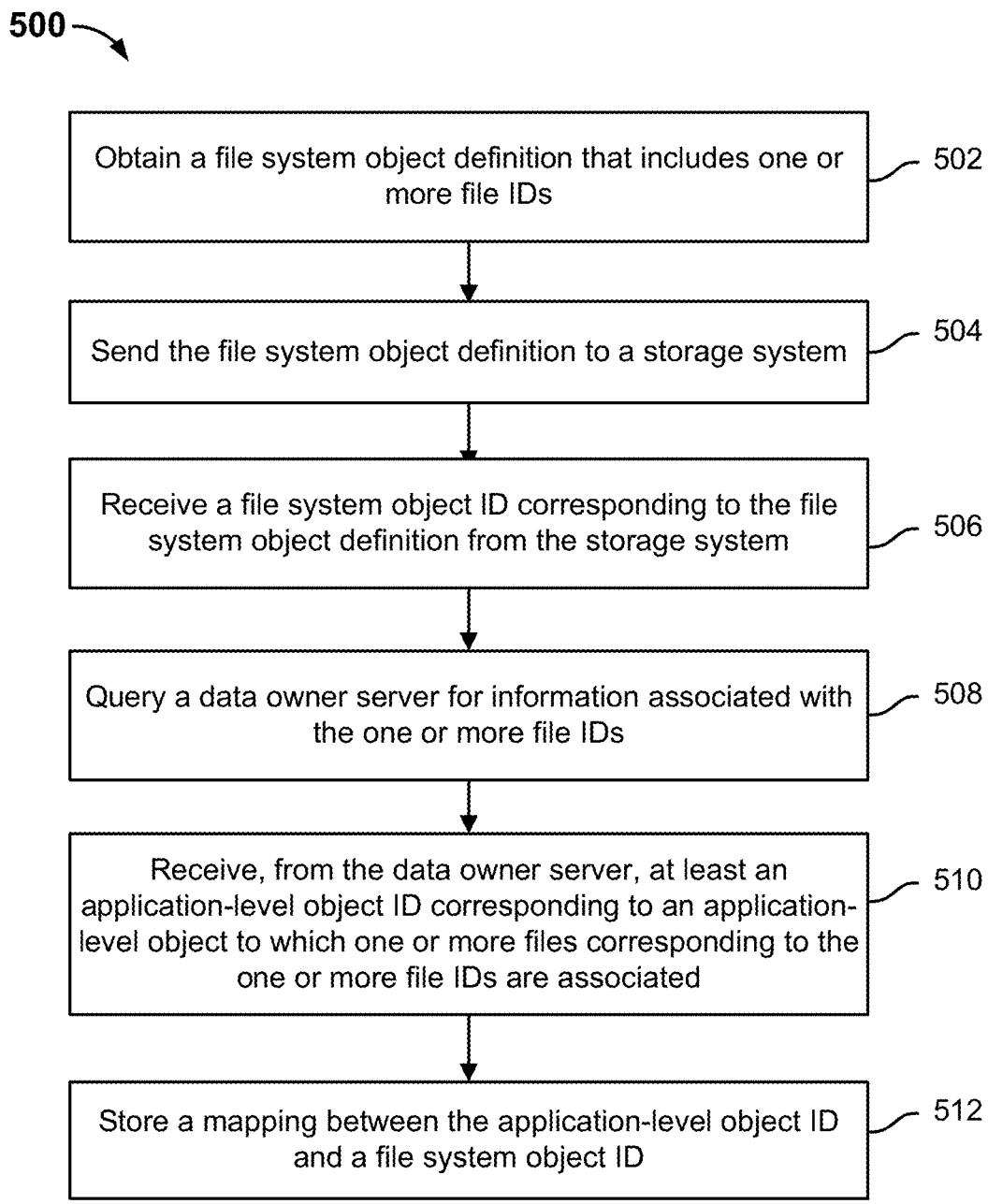
FIG. 5 is a flow diagram showing an example process of storing mappings between data owner object IDs and file system object IDs.

FIG. 5 is a flow diagram showing an example process of storing mappings between data owner object IDs and file system object IDs. In some embodiments, process 500 is implemented at a storage system such as storage system manager server 104 of system 100 of FIG. 1.

At 502, a file system object definition that includes one or more file IDs is obtained. In some embodiments, the file system object definition is received via a user interface that is provided by the storage system manager server. In some embodiments, the file system object definition is received from a data owner server.

At 504, the file system object definition is sent to a storage system. In some embodiments, the file system object definition requests to a generate a new file system object if the definition does not include a file system object ID. In some embodiments, the storage system processes the file system object definition, at least in part, using a process such as process 400 of FIG. 4.

At 506, a file system object ID corresponding to the file system object definition is received from the storage system. In some embodiments, after the storage system generates and stores a new file system object, it sends a corresponding file system object ID to the storage system manager server.

At 508, a data owner server is queried for information associated with the one or more file IDs.

At 508, at least an application-level object ID corresponding to a data owner object to which one or more files corresponding to the one or more file IDs are associated are received from the data owner server. In some embodiments, where the data owner server executes an application, an application-level object ID comprises an ID corresponding to an application-level object. In some embodiments, if the file IDs corresponds to multiple application-level objects, then the data owner server may return multiple corresponding application-level object IDs.

At 510, a mapping between the application-level object ID and the file system object ID is stored. Mappings between the file system object ID and the application-level object IDs are stored at the storage system manager server so that the storage system manager server can later translate any management operations that identify application-level objects into operations that identify file system objects that are recognized by the storage system, as the storage system itself, in some embodiments, is not aware of the mappings/correspondences between files of application-level objects and files of file system objects.

Figure 6:
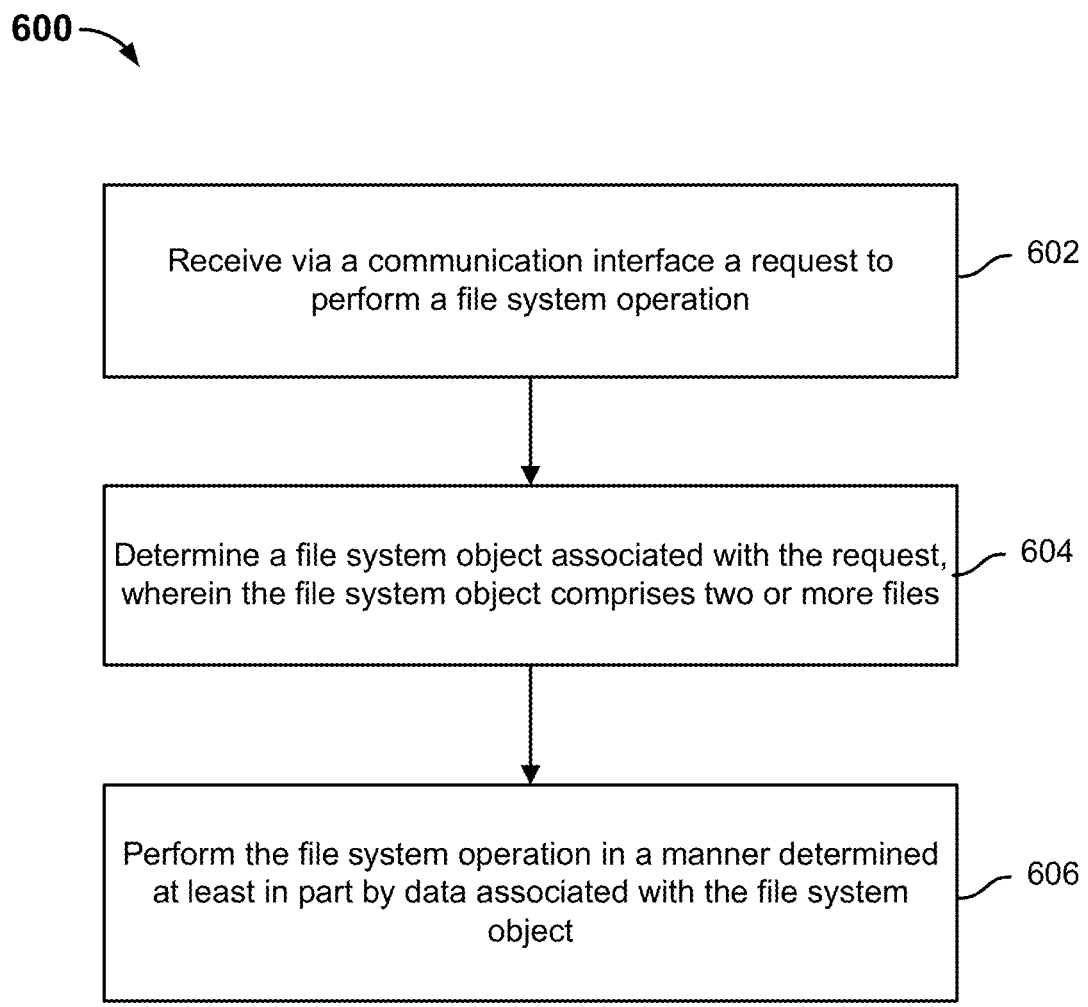
FIG. 6 is a flow diagram showing an embodiment of a process of performing a file system operation with respect to a file system object.

FIG. 6 is a flow diagram showing an embodiment of a process of performing a file system operation with respect to a file system object. In some embodiments, process 600 is implemented at a storage system such as storage system 106 of system 100 of FIG. 1.

At 602, a request to perform a file system operation is received via a communication interface.

In some embodiments, the request to perform a file system operation is received from a data owner server. For example, the request to perform a file system operation that is received from a data owner server is either a read operation or a write operation. In some embodiments, the request to perform a file system operation that is received from a data owner server includes one or more file IDs to which the operation is applicable.

In some embodiments, the request to perform a file system operation is received from a storage system manager server. For example, the request to perform a file system operation that is received from a storage system manager server is a management operation. Examples of a management operation include, but are not limited to, the following: defining a new file system object, taking a snapshot of at least a portion of a file system object, cloning a new file system object, reverting at least a portion of a file system object to a snapshot, replication of at least a portion of a file system object, migrating at least a portion of a file system object, importing a file system object, adding a file to the definition of a file system object, removing a file from the definition of a file system object, changing the name of a file system object, monitoring of a least a portion of a file system object, setting a policy for a least a portion of a file system object, and obtaining statistics with respect to at least a portion a file system object. In some embodiments, the request to perform a file system operation that is received from a storage system manager server includes one or more file IDs and/or one or more file system object IDs to which the operation is applicable.

At 604, a file system object associated with the request is determined, wherein the file system object comprises two or more files. If the request included a file system object ID, then the file system object corresponding to that file system object ID can be determined. Otherwise, if the request does not include a file system object ID but at least one file ID, then the file ID is compared to stored sets of file system object metadata to determine a matching set of file system object metadata. The file system object ID that is included in the matching set of file system object metadata corresponds to the determined file system object. In some embodiments, more than one file system object that matches the request to perform a file system operation can be determined.

At 606, the file system operation is performed in a manner determined at least in part by data associated with the file system object. To which portion of the determined file system object the file system operation applies is determined based on the information included in the request or file system operation. Put another way, which at least a subset of the files of the determined file system object on which the file system operation is to operate is determined. For example, the request to perform the file system operation specifies the file ID(s) of the file(s) of the file system object to which the file system operation is to be performed. At least a portion of a set of file system object metadata, policies, and collected statistics associated with the file system object are obtained. The file system operation is then executed on the determined at least subset of the files of the file system operation using the obtained data. In some embodiments, executing the file system operation includes updating at least one of the set of file system object metadata, policies, and collected statistics associated with the file system object.

Each of FIGS. 7, 8, 9, and 10 describes a different example of performing a file system operation at a storage system.

Figure 7:
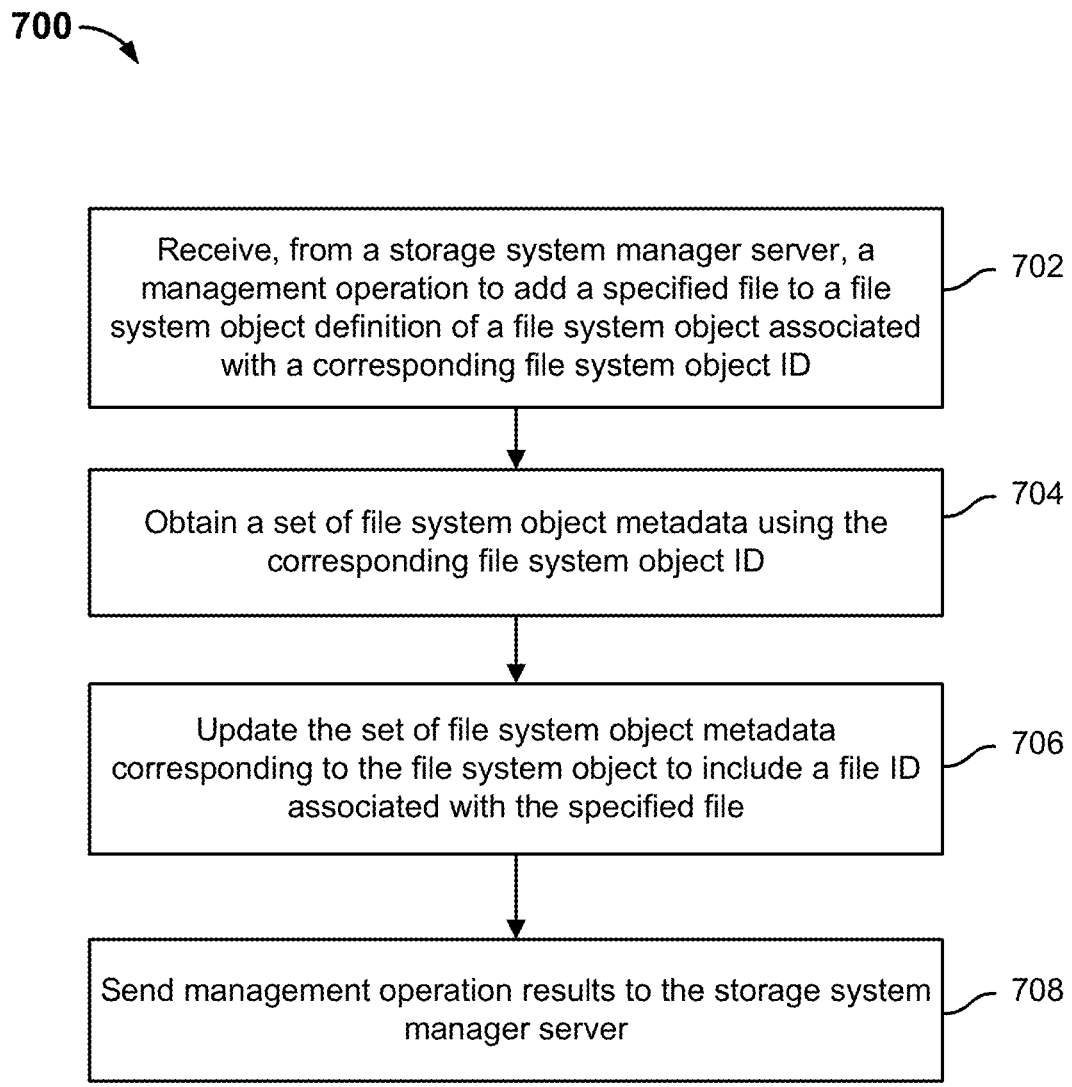
FIG. 7 is a flow diagram showing an example process of performing a file system operation with respect to adding a file to the definition of a file system object.

FIG. 7 is a flow diagram showing an example process of performing a file system operation with respect to adding a file to the definition of a file system object. In some embodiments, process 700 is implemented at a storage system such as storage system 106 of system 100 of FIG. 1. In some embodiments, process 600 of FIG. 6 is implemented, at least in part, using process 700.

In the example of process 700, the "file system operation" is a management operation to add a specified file to a file system object definition of a file system object. As shown in process 700, the definition of a file system object that was previously generated (e.g., using a process such as process 400 of FIG. 4) can be dynamically updated, including by associating a new file with the file system object.

At 702, a management operation to add a specified file to a file system object definition of a file system object associated with a corresponding file system object ID is received from a storage system manager server. In some embodiments, a specified file is requested to be added to a file system object from a data owner server or input by a user at a user interface that is provided by the storage system manager server. The management operation may include the file ID of the specified file and also the file system object ID of the file system object for which the definition is to be updated. The specified file had already been deduplicated and storage to the storage media. For example, prior to process 700, a data owner server had already sent, to the storage system, a write operation to write the data of the specified file to the storage system. In some embodiments, at which physical locations on the storage media the specified file's data is stored is represented by logical to physical offset mappings in an index corresponding to the specified file.

In some other embodiments, the management operation to add a specified file to a file system object is received from a data owner server, in the event that the data owner server stored file system object IDs and their relationships to files and/or application-level objects that were managed by the data owner server.

At 704, a set of file system object metadata is obtained using the corresponding file system object ID. The stored set of file system object metadata that includes the file system object ID of the management operation is obtained at the storage system.

At 706, the set of file system object metadata corresponding to the file system object is updated to include a file ID associated with the specified file. The obtained set of file system object metadata is updated to include at least the file ID of the specified file that is to be added to the definition of the file system object. In some embodiments, the set of file system object metadata is updated to also include the index corresponding to the specified file.

At 708, management operation results are sent to the storage system manager server. Information associated with whether the specified file was successfully associated with the file system object is sent back to the storage system manager. For example, if both the set of file system object metadata corresponding to the file system object ID of the management operation and the specified file that is associated with the file ID of the management operation could be found at the storage system, and the file system object metadata could be successfully updated, then a successful result to the management operation can be returned to the storage system manager server.

Figure 8:
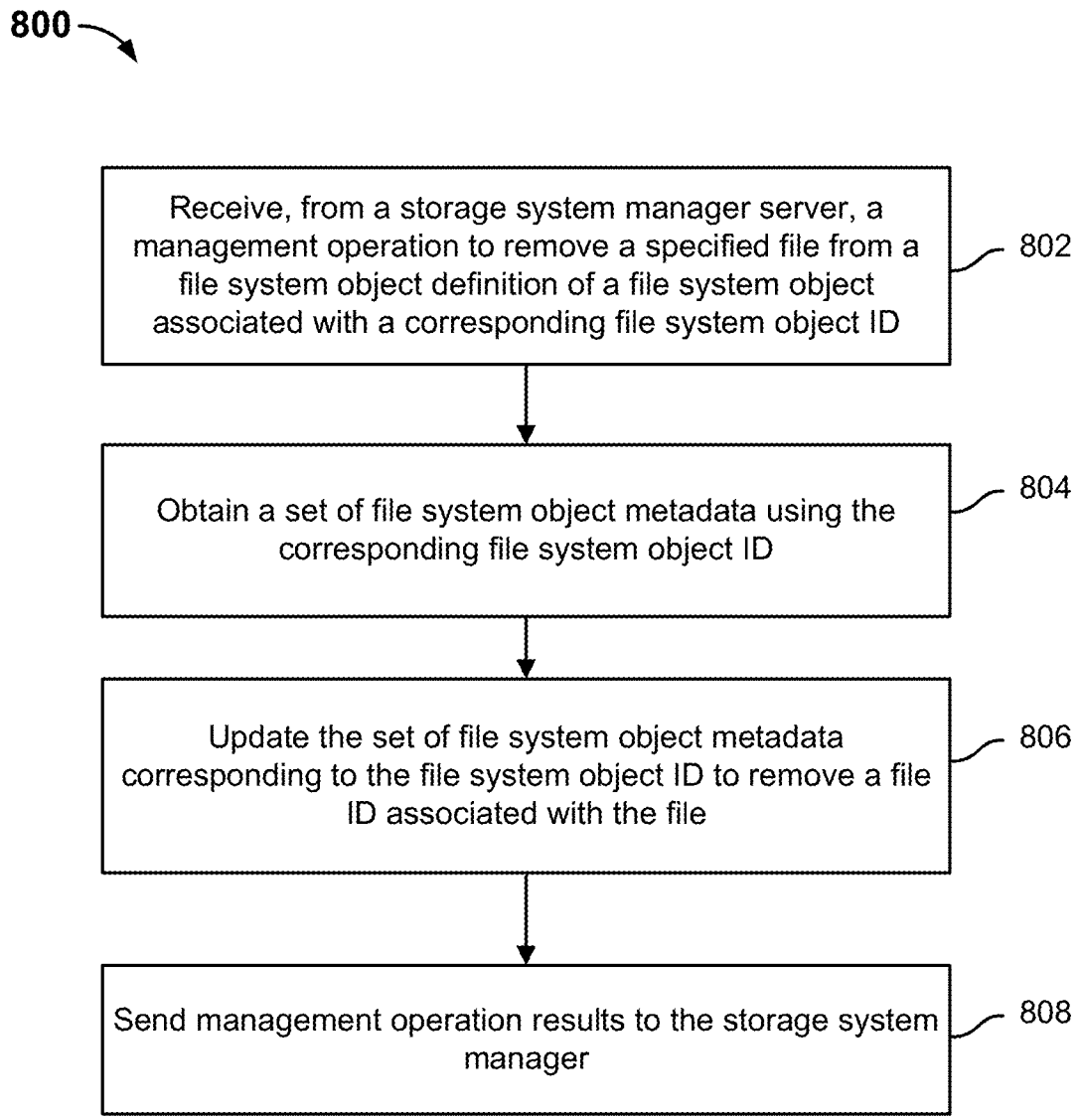
FIG. 8 is a flow diagram showing an example process of performing a file system operation with respect to removing a file from the definition of a file system object.

FIG. 8 is a flow diagram showing an example process of performing a file system operation with respect to removing a file from the definition of a file system object. In some embodiments, process 800 is implemented at a storage system such as storage system 106 of system 100 of FIG. 1. In some embodiments, process 600 of FIG. 6 is implemented, at least in part, using process 800.

In the example of process 800, the "file system operation" is a management operation to remove a specified file from a file system object definition of a file system object. As shown in process 800, the definition of a file system object that was previously generated (e.g., using a process such as process 400 of FIG. 4) can be dynamically updated, including by removing the association of a file from the file system object.

At 802, a management operation to remove a specified file from a file system object definition of a file system object associated with a corresponding file system object ID is received from a storage system manager server. In some embodiments, a specified file is requested to be removed from a file system object from a data owner server or input by a user at a user interface that is provided by the storage system manager server. The management operation may include the file ID of the specified file and also the file system object ID of the file system object for which the definition is to be updated. The specified file had already been deduplicated and stored to the storage media. For example, prior to process 800, a data owner server had already sent, to the storage system, a write operation to write the data of the specified file to the storage system. In some embodiments, at which physical locations on the storage media the specified file's data is stored is represented by logical to physical offset mappings in an index corresponding to the specified file.

In some other embodiments, the management operation to remove a specified file from a file system object is received from a data owner server, in the event that the data owner server stored file system object IDs and their relationships to files and/or application-level objects that were managed by the data owner server.

At 804, a set of file system object metadata is obtained using the corresponding file system object ID. The stored set of file system object metadata that includes the file system object ID of the management operation is obtained at the storage system.

At 806, the set of file system object metadata corresponding to the file system object is updated to remove a file ID associated with the specified file. The obtained set of file system object metadata is updated to remove at least the file ID of the specified file that is to be removed from the definition of the file system object. In some embodiments, the set of file system object metadata is updated to also remove the index corresponding to the specified file.

In some embodiments, the file that is removed from the definition of the file system object is not necessarily deleted from the storage system. Rather, the file becomes a "stray" file until it is requested to be deleted or until it is requested to be added to the definition of another file system object at the storage system.

At 808, management operation results are sent to the storage system manager server. Information associated with whether the specified file was successfully associated with the file system object is sent back to the storage system manager. For example, if the set of file system object metadata corresponding to the file system object ID of the management operation had been found to include the file ID of the specified file of the management operation, and the file system object metadata could be successfully updated, then a successful result to the management operation can be returned to the storage system manager server.

Figure 9:
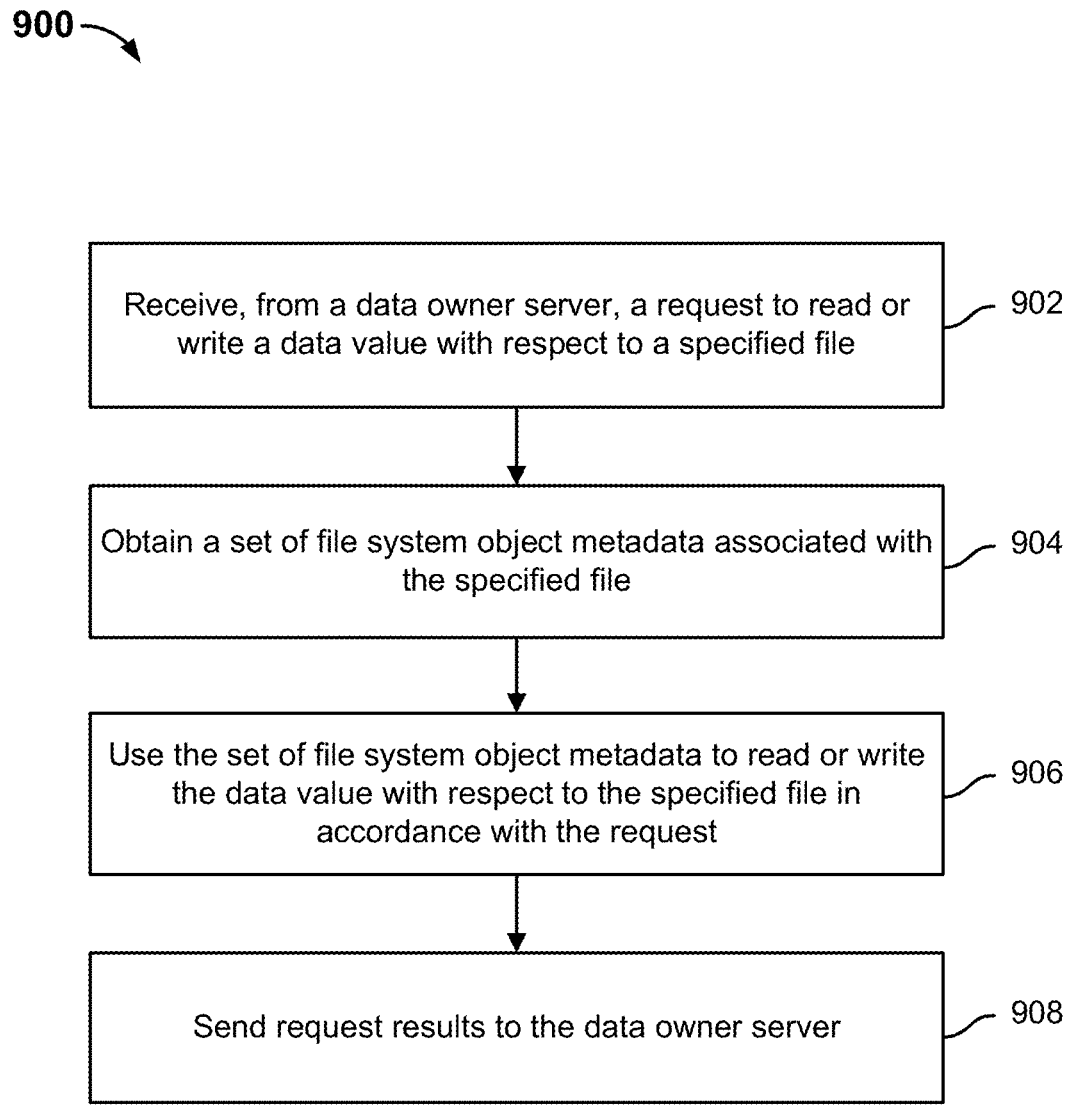
FIG. 9 is a flow diagram showing an example process of performing a file system operation with respect to reading or writing a data value with respect to a file associated with a file system object.

FIG. 9 is a flow diagram showing an example process of performing a file system operation with respect to reading or writing a data value with respect to a file associated with a file system object. In some embodiments, process 900 is implemented at a storage system such as storage system 106 of system 100 of FIG. 1. In some embodiments, process 600 of FIG. 6 is implemented, at least in part, using process 900.

In the example of process 900, the "file system operation" is an operation to read or write a data value with respect to a specified file of a file system object.

At 902, a request to read or write a data value with respect to a specified file is received from a data owner server. The request to perform a read operation or a write operation of a data value with respect to a specified file includes a file ID associated with the file. In a first example, if the request included a read operation, then in addition to the file ID, the request may include an offset associated with the file and a size of data to be read from that offset. In a second example, if the request included a write operation, then in addition to the file ID, the request may include an offset associated with the file, a size of a data value to be written starting at that offset, and the actual data value that is to be written.

At 904, a file system object metadata associated with the specified file is determined. In some embodiments, a file system object metadata associated with the specified file is determined by comparing the file ID that is included in the request to sets of file system object metadata to find a set of file system object metadata that includes that file ID. The file system object ID that corresponds to that found set of file system object metadata is determined to be associated with the specified file.

At 906, the set of file system object metadata is used to read or write the data value with respect to the specified file in accordance with the request. In some embodiments, the set of file system object metadata includes data that tracks where on the physical storage media different portions (e.g., data blocks) of each file are stored. Specifically, in some embodiments, the data that tracks where on the physical storage media different portions (e.g., data blocks) of each file are stored comprises indices that store mappings between logical offsets of files to physical offsets at which corresponding data blocks are stored. Such an index that corresponds to the specified file is then found within the found set of file system object metadata. If the request is to read a data value, then the index is used to look up a stored mapping (if any) corresponding to the offset that is specified in the request and the mapping is used to read the requested data value from the physical storage media. If the request is to write a data value, then the index is used to look up a stored mapping (if any) corresponding to the offset that is specified in the request and the mapping is used to write the specified data value at the specified offset at the physical storage media.

At 908, request results are sent to the data owner server. The results of the read operation or the write operation are sent back to the data owner server. For example, if the requested read operation was successfully performed, then the read data value would be sent back to the data owner server. In another example, if the requested write operation was successfully performed, then confirmation that the data value was successfully stored at the storage system would be sent back to the data owner server.

Figure 10:
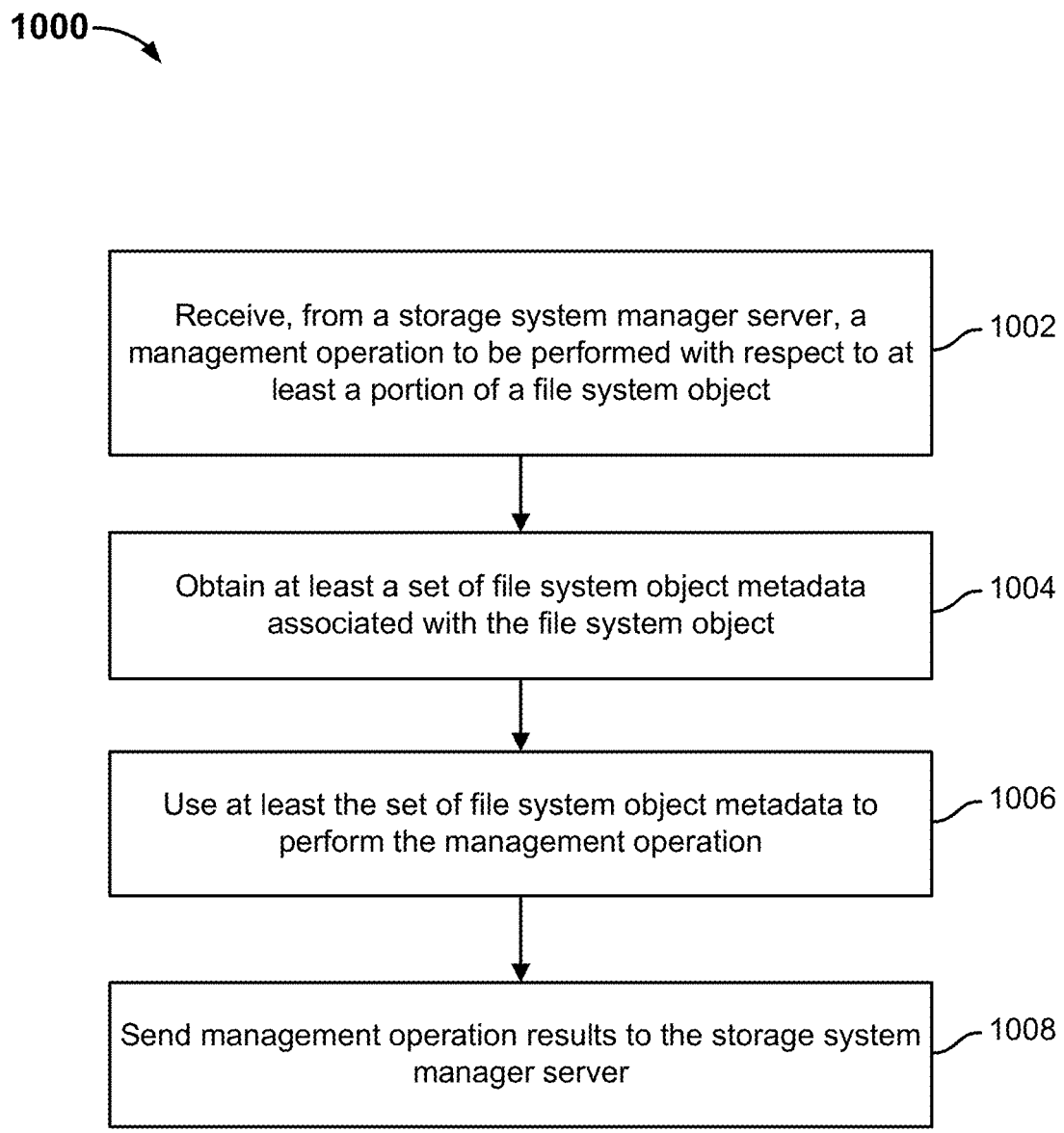
FIG. 10 is a flow diagram showing an example process of performing a file system operation with respect to at least a portion associated with a file system object.

FIG. 10 is a flow diagram showing an example process of performing a file system operation with respect to at least a portion associated with a file system object. In some embodiments, process 1000 is implemented at a storage system such as storage system 106 of system 100 of FIG. 1. In some embodiments, process 600 of FIG. 6 is implemented, at least in part, using process 1000.

In the example of process 1000, the "file system operation" can be any one of various examples of non-file system object definition related management operations to be performed on at least a portion of a file system object. Examples of the non-file system object definition related management operations may include, but are not limited to, the following: taking a snapshot of at least a portion of the file system object, cloning at least a portion of the file system object, reverting at least a portion of the file system object to a snapshot, quiescing at least a portion of a file system object, replicating at least a portion of the file system object, migrating at least a portion of the file system object, importing at least a portion of a file system object, monitoring at least a portion of the file system object, setting a policy for at least a portion of the file system object, reporting statistics associated with at least a portion of the file system object, and changing the ID of at least a portion of the file system object.

At 1002, a management operation to be performed with respect to at least a portion of a file system object is received from a storage system manager server. For example, the management operation specifies the type of requested action to be performed, one or more file IDs of file(s) on which the requested action is to be performed, and/or a file system object ID. The management operation may specify the granularity of the file system object at which the type of requested action is to be performed. The granularity of the file system object may refer to a subset of files or all files of the file system object.

At 1004, at least a set of file system object metadata associated with the file system object is obtained. If a file system object ID were already included in the management operation, then the file system object ID is used to obtain a corresponding set of file system object metadata. However, if a file system object ID were not already included in the management operation but one or more file IDs were included in the management operations, then each of the file IDs would be compared against sets of file system object metadata for a set of metadata that included that file ID. In some embodiments, it is possible that the file IDs that were included in the management operation match more than one set of file system object metadata. In some embodiments, if the type of requested action to be performed by the management operation pertained to policies and/or statistics that have been stored for the file system object, then those sets of data are also obtained.

At 1006, at least the set of file system object metadata is used to perform the management operation. Depending on the type of requested action to be performed, a different portion of the data that has been obtained for the file system object may be used to perform the requested action at the specified granularity of the file system object.

In a first example, if the type of requested action is to perform a snapshot on a specified file of a file system object, then the index that describes where data associated with the file is stored on the storage media (e.g., via mappings between logical to physical offsets) can be first obtained from the set of file system object metadata. Then, the index can be made read-only and stored as the snapshot of the file and a new, empty index can be generated corresponding to the file. The new, empty index will then store any subsequent writes made to the file and the new, empty index also points to the generated snapshot. Any subsequent reads to the file can be first search through the new index and if the search cannot be satisfied by the new index, the search can proceed to the snapshot for the requested data.

In a second example, if the type of requested action is to generate a clone from a snapshot of a specified file of a file system object, then the index that describes where data associated with the file is stored on the storage media (e.g., via mappings between logical to physical offsets) can be first obtained from the set of file system object metadata. Then, a new, empty index can be generated corresponding to a new clone of the file. The new, empty index will then store any subsequent writes made to the new clone and the new, empty index also points to the index of the source file. Any subsequent reads to the new clone can first search through the new index corresponding to the new clone and if the search cannot be satisfied by the new index, the search can proceed to the index of the source file for the requested data.

In a third example, if the type of requested action is to determine whether a file system object should be migrated to a different storage system, then the collected statistics for each file of the file system object can be first obtained. For example, the collected statistics for each file of the file system object can represent the trend at which storage space that is used by the files of the file system object has changed in a recent window of time (e.g., the past week). The collected historical statistics pertaining to the file system object can be used to predict future statistics pertaining to the file system object. The predicted future statistics pertaining to the file system object can be evaluated against the capacities of its current storage system to determine whether the file system object should be migrated to another storage system (e.g., with available storage space).

In a fourth example, if the type of requested action is to obtain a report on collected statistics with regard to a file system object, then the collected statistics for each file of the file system object can be first obtained. The collected statistics for all the files of the file system object can be aggregated or otherwise synthesized to generate a statistics-based report. Examples of statistics may include, but are not limited to, the following: rate of read and write access to the file system object, the throughput of the file system object, the cache hit ratio achieved by the storage system for the file system object, and the amount of storage consumed by the file system object.

In a fifth example, if the type of requested action is to change a policy with respect to a file system object, then the stored policies for the file system object can be obtained. The stored policies can then be updated based on the requested action.

At 1008, management operation results are sent to the storage system manager server. A message that describes whether the management operation was successfully performed may be sent back to the storage system manager server.

Figure 11:
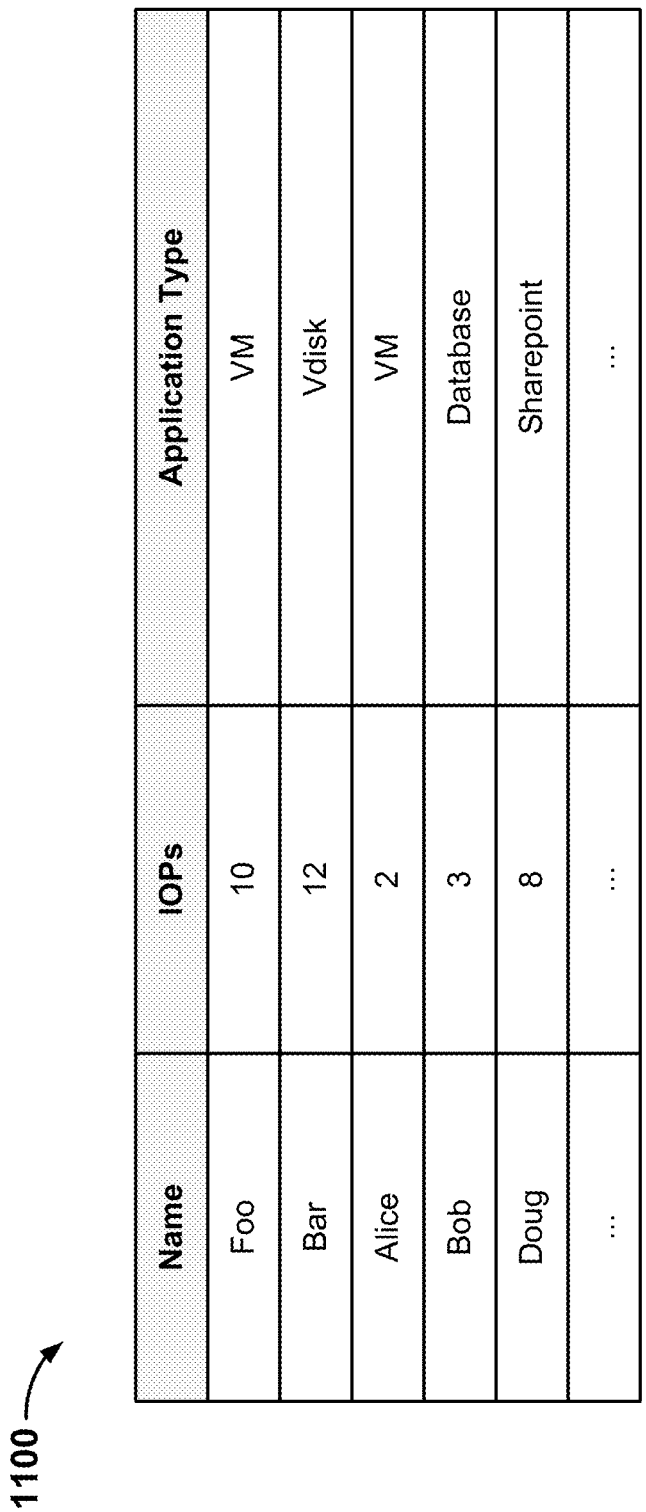
FIG. 11 is a diagram showing an example user interface that can be provided by a storage system manager server.

FIG. 11 is a diagram showing an example user interface that can be provided by a storage system manager server. As mentioned above, in some embodiments, a storage system manager server stores mappings between application-level object IDs and file system object IDs and/or mappings between application-level object IDs and file IDs. As mentioned above, an application-level object ID may also include the type of application to which the object belongs. As such, in response to a user request to view a list of information related to application-level objects for which files are stored at one or more storage systems that are managed by the storage system manager server, the storage system manger server can use its stored mappings as well as other information that is queried from the storage system(s) to generate a user interface such as user interface 1100. In user interface 1100, each application-level object is presented within a corresponding row with its corresponding name (application-level object ID), IOPs (the rate of read and write access to the file system object), and application type. As mentioned above, each application-level object may map to one or more file system objects that are recognized by the storage system. For example, a user may define multiple application-level objects to be associated with one file system object so that a single management operation can be performed across all such application-level objects by simply issuing that management operation to the file system object. Nevertheless, irrespective of the mapping relationships between application-level objects and file system objects, the storage system manager server can still present a user interface such as user interface 1100 to show information on a per-application-level object basis.

Figure 12:
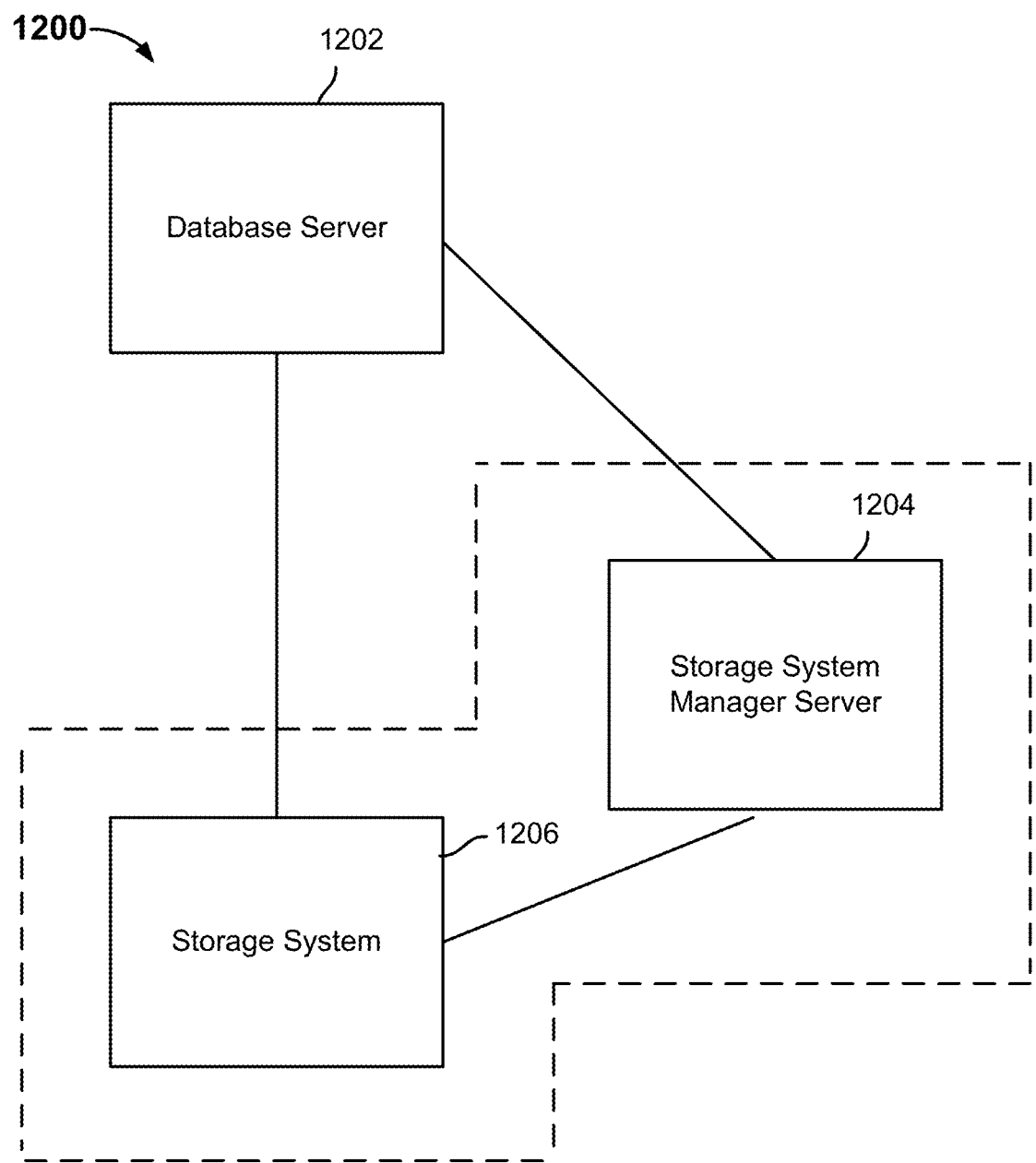
FIG. 12 is a diagram showing an example of a system for storing file system objects.

FIG. 12 is a diagram showing an example of a system for storing file system objects. In the example, system 1200 includes database server 1202, storage system manager server 1204, and storage system 1206. Each of database server 1202, storage system manager server 1204, and storage system 1206 communicates to each other over a network (not shown). For example, the network (not shown) may be implemented using one or more of high-speed and/or data networks.

In some embodiments, storage system manager server 1204 may be implemented similarly to storage system manager server 104 of system 100 of FIG. 1. In some embodiments, storage system 1206 may be implemented similarly to storage system 106 of system 100 of FIG. 1.

In some embodiments, database server 1202 is a specific example of data owner server 102 of system 100 of FIG. 1. Database server 1202 executes a database management server (DBMS) application that generates database objects as application-level objects. In the context of database objects, in some examples, each database object includes at least two files; the first file being a write ahead log file that stores recent data written to the database object and the second file being a data file that stores non-recent data written to the database object. Database server 1202 is configured to request storage system 1206 to write the one or more files associated with each database object to storage media. In some embodiments, the write operations may include at least a corresponding file ID for each file and each file's corresponding data. In some embodiments, the write operations do not include a database object ID corresponding to any of the files.

Storage system manager server 104 is configured to (e.g., periodically) query database server 1202 for management operations with respect to application-level objects and for information related to read or write operations that data owner server 102 had directly sent to storage system 106. After database server 1202 had sent write operations to write the one or more files belonging to a database object to storage system 1206, storage system manager server 1204 would obtain from database server 1202 information that would indicate that the file IDs belonging to the files of the write operations belong to a particular database object ID. In some embodiments, storage system manager server 1204 is configured to store mappings between each database object ID and the file IDs that belong to the corresponding database object. Storage system manager server 1204 may also receive (e.g., from either database server 1202 or a user interface) a file system object definition to associate the one or more files that have been recently written to storage system 1206 with a new file system object. Storage system manager server 1204 is configured to push the file system object definition down to storage system 1206 so that storage system 1206 would be caused to generate a set of new file system object metadata with a new, unique file system object ID. The set of new file system object metadata that is generated by storage system 1206 includes the file IDs of the one or more file IDs and also information (e.g., indices) that describe where data associated with the one or more files that are included in the file system object definition are stored at the storage media. Storage system 1206 is configured to send the new, unique file system object ID to storage system manager server 1204 so that storage system manager server 1204 can update its stored mappings to include the correspondence between the database object ID and the file IDs that belong to the corresponding database object, and the new file system object ID. Storage system manager server 1204 may also obtain polices associated with the database object from database server 1202 and send such policies to storage system 1206 for storage system 1206 to store.

As new data is written to (e.g., new rows of data are added to the database, an existing row is updated, a new table is created in the database) the database object at database server 1202, database server 1202 is configured to send write operations to storage system 1206 to write the new data to a file associated with a specified file ID. Storage system 1206 can perform the write operations to the file, in part, by obtaining the set of file system object metadata that includes the specified file ID and updating the index corresponding to that file to reflect the new locations, if any, on the physical storage media to which data has been written in the file. As data is requested to be read from (e.g., requested rows of data) the database object at database server 1202, database server 1202 is configured to send read operations to storage system 1206 to read the requested data from a file associated with a specified file ID. Storage system 1206 can perform the read operations to the file, in part, by obtaining the set of file system object metadata that includes the specified file ID and using the index corresponding to that file to look up where on the physical storage media the requested data is stored.

Storage system manager server 1204 is configured to receive management operations (e.g., from either database server 1202 or a user interface) with respect to the database object ID. Using the stored mappings, storage system manager server 1204 is configured to translate the received management operations that identify the database object ID into an operation that identifies the corresponding file system object ID. Storage system manager server 1204 is configured to send the translated operation to storage system 1206 for storage system 1206 to execute the operation using the set of file system object metadata associated with the file system object ID.

While the example of FIG. 12 describes defining the files of one database object to belong to a file system object, in other examples, files belonging to multiple database objects may be defined to belong to a single file system object to simplify the performance of the storage management operations on the files of the database objects.

The examples process described above in FIGS. 6, 7, 8, 9, and 10 may be implemented at storage system 1202 as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface; and
a processor coupled to the communication interface and configured to:
receive a request to perform a file system operation from a storage system manager server, wherein the file system operation is generated by the storage system manager server translating a first operation that identifies an application-level object and the translation is performed based on stored mappings between file system object identifiers (IDs) and application-level object identifiers (IDs);
determine a file system object associated with the request, wherein the file system object is dynamically defined to include two or more files; and
perform the file system operation in a manner determined at least in part by data associated with the file system object, including by updating a set of file system object metadata associated with the file system object,
wherein the set of file system object metadata associated with the file system object describes file identifiers (IDs) associated with the two or more files that currently belong to the file system object; and
wherein the set of file system object metadata associated with the file system object further describes where on storage media underlying data associated with the two or more files that currently belong to the file system object is stored.

2. The system of claim 1, wherein the request comprises a first request, and wherein the processor is further configured to:
receive a second request to store a set of files; and
store the set of files on the storage media based at least in part on the second request.

3. The system of claim 2, wherein the processor is further configured to:
receive a file system object definition that instructs to associate the set of files with a new file system object, the new file system object being the file system object;
generate the set of file system object metadata corresponding to the file system object, wherein the set of file system object metadata includes at least a file system object ID; and
send the file system object ID.

4. The system of claim 1, wherein the file system operation comprises a management operation to add a specified file to a file system object definition associated with the file system object, wherein the file system object definition comprises a file system object ID corresponding to the file system object, and wherein the processor is further configured to:
obtain the set of file system object metadata using the file system object ID;
update the set of file system object metadata corresponding to the file system object to include a file ID associated with the specified file; and
send management operation results.

5. The system of claim 1, wherein the file system operation comprises a management operation to remove a specified file from a file system object definition associated with the file system object, wherein the file system object definition comprises a file system object ID corresponding to the file system object, and wherein the processor is further configured to:
obtain the set of file system object metadata using the file system object ID;
update the set of file system object metadata corresponding to the file system object to remove a file ID associated with the specified file; and
send management operation results.

6. The system of claim 1, wherein the file system operation comprises an operation to read or write a data value with respect to a specified file, and wherein the processor is further configured to:
obtain the set of file system object metadata using the specified file;
use the set of file system object metadata to read or write the data value with respect to the specified file in accordance with the request; and
send operation results.

7. The system of claim 1, wherein the file system operation comprises a management operation to be performed with respect to at least a portion of the file system object, and wherein the processor is further configured to:
obtain at least the set of file system object metadata associated with the file system object;
use the at least set of file system object metadata to perform the management operation; and
send management operation results.

8. The system of claim 7, wherein the file system operation comprises one or more of the following: taking a snapshot of at least a portion of the file system object, cloning at least a portion of the file system object, reverting at least a portion of the file system object to a snapshot, quiescing at least a portion of the file system object, replicating at least a portion of the file system object, migrating at least a portion of the file system object, importing at least a portion of the file system object, monitoring at least a portion of the file system object, setting a policy for at least a portion of the file system object, reporting statistics associated with at least a portion of the file system object, and changing a file system object ID of the file system object.

9. The system of claim 7, wherein the processor is further configured to obtain at least one of a set of statistics and a set of policies associated with the file system object.

10. The system of claim 1, wherein the processor is further configured to obtain a set of statistics associated with at least a portion of the file system object.

11. The system of claim 10, wherein the set of statistics associated with at least a portion of the file system object comprises: a rate of read and write access to the file system object, a throughput of the file system object, a cache hit ratio achieved by a storage system for the file system object, and an amount of storage consumed by the file system object.

12. The system of claim 1, wherein the translation by the storage system manager server translates the first operation that identifies the application-level object into the request that identifies the file system object.

13. A method, comprising:
receiving, via a communication interface, a request to perform a file system operation from a storage system manager server, wherein the file system operation is generated by the storage system manager server translating a first operation that identifies an application-level object and the translation is performed based on stored mappings between file system object identifiers (IDs) and application-level object identifiers (IDs);
determining a file system object associated with the request, wherein the file system object is dynamically defined to include two or more files; and
performing the file system operation in a manner determined at least in part by data associated with the file system object, including by updating a set of file system object metadata associated with the file system object, wherein the set of file system object metadata associated with the file system object describes file identifiers (IDs) associated with the two or more files that currently belong to the file system object; and
wherein the set of file system object metadata associated with the file system object further describes where on storage media underlying data associated with the two or more files that currently belong to the file system object is stored.

14. The method of claim 13, wherein the request comprises a first request, and further comprising:
receiving a second request to store a set of files; and
storing the set of files on the storage media based at least in part on the second request.

15. The method of claim 14, further comprising:
receiving a file system object definition that instructs to associate the set of files with a new file system object, the new file system object being the file system object;
generating the set of file system object metadata corresponding to file system object, wherein the set of file system object metadata includes at least a file system object ID; and
sending the file system object ID.

16. The method of claim 13, wherein the file system operation comprises a management operation to add a specified file to a file system object definition associated with the file system object, wherein the file system object definition comprises a file system object ID corresponding to the file system object, and wherein the method further comprising:
obtaining the set of file system object metadata using the file system object ID;
updating the set of file system object metadata corresponding to the file system object to include a file ID associated with the specified file; and
sending management operation results.

17. The method of claim 13, wherein the file system operation comprises a management operation to remove a specified file from a file system object definition associated with the file system object, wherein the file system object definition comprises a file system object ID corresponding to the file system object, and wherein the method further comprising:
obtaining the set of file system object metadata using the file system object ID;
updating the set of file system object metadata corresponding to the file system object to remove a file ID associated with the specified file; and
sending management operation results.

18. The method of claim 13, wherein the file system operation comprises an operation to read or write a data value with respect to a specified file, and wherein the method further comprising:
obtaining the set of file system object metadata using the specified file;

using the set of file system object metadata to read or write the data value with respect to the specified file in accordance with the request; and sending operation results.

19. The method of claim 13, wherein the file system operation comprises a management operation to be performed with respect to at least a portion of the file system object, and wherein the method further comprising:

obtaining at least the set of file system object metadata associated with the file system object;

using the at least set of file system object metadata to perform the management operation; and sending management operation results.

20. The method of claim 19, further comprising obtaining at least one of a set of statistics and a set of policies associated with the file system object.

21. A computer program product, the computer program product being embodied in a non-transitory computer-readable storage medium and comprising computer instructions for:

receiving, via a communication interface, a request to perform a file system operation from a storage system manager server, wherein the file system operation is generated by the storage system manager server translating a first operation that identifies an application-level object and the translation is performed based on stored mappings between file system object identifiers (IDs) and application-level object identifiers (IDs);

determining a file system object associated with the request, wherein the file system object is dynamically defined to include two or more files; and performing the file system operation in a manner determined at least in part by data associated with the file system object, including by updating a set of file system object metadata associated with the file system object, wherein the set of file system object metadata associated with the file system object describes file identifiers (IDs) associated with the two or more files that currently belong to the file system object; and wherein the set of file system object metadata associated with the file system object further describes where on storage media underlying data associated with the two or more files that currently belong to the file system object is stored.

* * * * *